UNITED STATES PATENT OFFICE.

CLAUDE M. KING, OF COILA, MISSISSIPPI.

CEMENT COMPOSITION.

1,323,597. Specification of Letters Patent. Patented Dec. 2, 1919.

No Drawing. Application filed March 4, 1919. Serial No. 280,582.

*To all whom it may concern:*

Be it known that I, CLAUDE M. KING, a citizen of the United States, residing at Coila, in the county of Carroll and State of Mississippi, have invented certain new and useful Improvements in Cement Compositions; and I do hereby declare the following to be a full, clear, and exact description of the invention, such as will enable others skilled in the art to which it appertains to make and use the same.

This invention relates to cement compositions, and more particularly to a cement which is specially adapted to be used for repairing purposes.

The primary object of the invention is to provide a cement of the character stated which may be readily used for repairing furniture and household articles of various sorts, as well as for repairing marble, slate, and similar materials.

A further object is to provided a cement which may be readily produced at relatively small cost and may be easily used.

Further objects will appear from the detailed description.

After a number of experiments extending over a period of several years I have found that it is possible to form a cement composition which may be readily used for filling depressions or openings in furniture and numerous other household articles, this cement being capable of being stained or varnished over and treated in the same manner as the article to which it is applied so as to be practically indistinguishable therefrom, thus producing a very neat appearance. In addition, the cement when applied to furniture and similar articles does not, upon drying, tend to shrink away from the article and break or chip off. After a great number of experiments I have found that such a cement may be formed by mixing in a suitable manner proper quantities of resin, Spanish whiting, paraffin, and linseed oil.

In practice I prefer to use the above stated ingredients in approximately the following proportions:

| | |
|---|---|
| Resin | 40 pounds, |
| Spanish whiting | 60 pounds, |
| Paraffin | 2 pounds, |
| Linseed oil | 500 drops, |

The resin is ground to form a relatively fine powder which is then roasted at a temperature of approximately 212° Fahrenheit for about 40 minutes, or until the resin becomes of a very dark or nearly black color. The Spanish whiting, which should be of a very good grade, is then added slowly and stirred into the resin, the cooking operation continuing, until the resulting mixture is of a creamy shade. After this, the paraffin is added, slowly and stirred in, the cooking continuing for 10 minutes longer, after which the linseed oil is added slowly and thoroughly stirred in, the cooking continuing for an additional 15 minutes, and the resulting composition being then poured into a suitable mold, which has been slightly greased, and permitted to set or harden. This setting of the composition is usually complete in approximately 3 hours, after which the block which has been thus formed may be removed from the mold and the cement thus produced is ready for use.

In using the cement, the desired quantity is broken from the block formed and is then heated at substantially boiling point until it becomes thoroughly softened and plastic, after which this softened cement may be readily molded and placed in the opening or recess in the article which it is desired to repair. After being placed in the article to be repaired, the cement is then permitted to set, after which it may be smoothed over and treated in the same manner as the article itself. I have found this cement particularly advantageous in repairing articles of furniture, as it may be readily stained or varnished over so as to closely resemble the furniture and form a continuation of the surface thereof, the cement being practically indistinguishable from the article repaired. In using this cement for repairing slate, marble and similar materials, I have found it advantageous to color the cement so as to closely approach the color of the article to be repaired. For this purpose any suitable coloring pigment, such as the so-called Venetian powders, may be employed. To produce a slate color, I prefer to employ lamp black, approximately one pound of this substance being used to every one hundred pounds of cement. It will be evident, however, that any suitable coloring matter preferred may be employed. This cement may also be used for securing pieces of broken articles together, in which case the cement is preferably fused and is applied to the broken edges of the pieces to be secured, after which these pieces may be placed in position and the cement permitted to set. If the cement is properly colored, repairs made in this manner are very difficult to detect and present a very neat appearance.

What I claim is:

1. A cement composition formed from a mixture of resin, whiting, paraffin, and linseed oil in such proportions as to produce a composition which will set within a comparatively short period of time and after setting may be rendered plastic by application of heat and when cooled will again set.

2. A cement composition formed from a mixture of approximately forty pounds of resin, sixty pounds of whiting, two pounds of paraffin, and five hundred drops of linseed oil.

3. A process of making a cement composition consisting in heating approximately forty pounds of ground resin until it assumes a dark or nearly black shade, adding slowly approximately sixty pounds of whiting and stirring the resulting mixture until it assumes a cream color the heating being continued, adding slowly two pounds of paraffin, the heating continuing for approximately ten minutes longer, adding slowly five hundred drops of linseed oil and continuing the heating for approximately fifteen minutes, and then pouring the resulting composition into a mold and permitting it to set.

In testimony whereof I affix my signature in presence of two witnesses.

CLAUDE M. KING.

Witnesses:
U. S. GRANT,
J. W. WILSON.